United States Patent
Quiter et al.

(10) Patent No.: US 12,230,021 B2
(45) Date of Patent: Feb. 18, 2025

(54) SYSTEM AND METHOD FOR FEATURE VISUALIZATION IN A CONVOLUTIONAL NEURAL NETWORK

(71) Applicant: GM Cruise Holdings LLC, San Francisco, CA (US)

(72) Inventors: Craig Quiter, Mountain View, CA (US); Siddhartho Bhattacharya, Danville, CA (US); Mayank Ketkar, San Mateo, CA (US); Raluca Musaloiu-Elefteri, San Francisco, CA (US); Wanlin Yang, San Francisco, CA (US); Sandeep Gangundi, San Jose, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 378 days.

(21) Appl. No.: 17/714,865

(22) Filed: Apr. 6, 2022

(65) Prior Publication Data
US 2023/0326194 A1  Oct. 12, 2023

(51) Int. Cl.
*G06V 10/82* (2022.01)
*G06N 3/08* (2023.01)
*G06V 10/774* (2022.01)

(52) U.S. Cl.
CPC .............. *G06V 10/82* (2022.01); *G06N 3/08* (2013.01); *G06V 10/7747* (2022.01)

(58) Field of Classification Search
CPC .. G06V 10/82; G06V 10/7747; G06V 10/774; G06V 20/58; G06V 10/454; G06N 3/08; G06N 20/00; G06N 3/0464; G06N 3/09

USPC ........................................................ 382/157
See application file for complete search history.

(56) References Cited

U.S. PATENT DOCUMENTS

| | | | |
|---|---|---|---|
| 10,446,898 B2 * | 10/2019 | Cheng | H01P 1/2005 |
| 10,915,798 B1 * | 2/2021 | Zhang | G06F 7/08 |
| 11,215,999 B2 * | 1/2022 | Uvarov | G06V 10/454 |
| 11,335,008 B2 * | 5/2022 | Chakraborty | G06T 19/20 |
| 11,562,556 B1 * | 1/2023 | Kabzan | G06V 10/7747 |
| 11,580,851 B2 * | 2/2023 | Tan | G06F 18/2415 |
| 11,620,858 B2 * | 4/2023 | Lee | A63B 24/0087 482/8 |
| 2017/0220904 A1 * | 8/2017 | Bai | G06V 10/774 |
| 2019/0164012 A1 * | 5/2019 | Zisimopoulos | G06N 20/00 |
| 2019/0228215 A1 * | 7/2019 | Najafirad | G06N 3/044 |
| 2019/0384047 A1 * | 12/2019 | Johnson | G01N 15/1429 |
| 2020/0050900 A1 * | 2/2020 | Schulter | G06N 3/088 |
| 2020/0357118 A1 * | 11/2020 | Yao | G06N 3/045 |
| 2021/0256718 A1 * | 8/2021 | Gangundi | G06V 10/82 |
| 2023/0196788 A1 * | 6/2023 | Govardhanam | B60W 60/001 382/104 |
| 2024/0062338 A1 * | 2/2024 | Ford, III | G06V 30/41 |

* cited by examiner

*Primary Examiner* — Negussie Worku
(74) *Attorney, Agent, or Firm* — Michael DiCato

(57) ABSTRACT

The disclosed technology provides methods for training of a convolutional neural network (CNN) to identify or predict its own errors, and then those errors are used as inputs with feature visualization to generate images of scenes associated with those errors. This allows adjustment of a set of labeled training images, and then the adjusted set of labeled training images are used to retrain or further train the CNN. Systems and machine-readable media are also provided.

20 Claims, 5 Drawing Sheets

SYSTEM AND METHOD FOR FEATURE VISUALIZATION IN A CONVOLUTIONAL NEURAL NETWORK

BACKGROUND

1. Technical Field

The disclosed technology provides solutions for improving models used for object detection and identification in autonomous vehicles (AVs) and in particular, for visualizing features that contribute to errors in object recognition and identification in a convolutional neural network.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning and obstacle avoidance.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
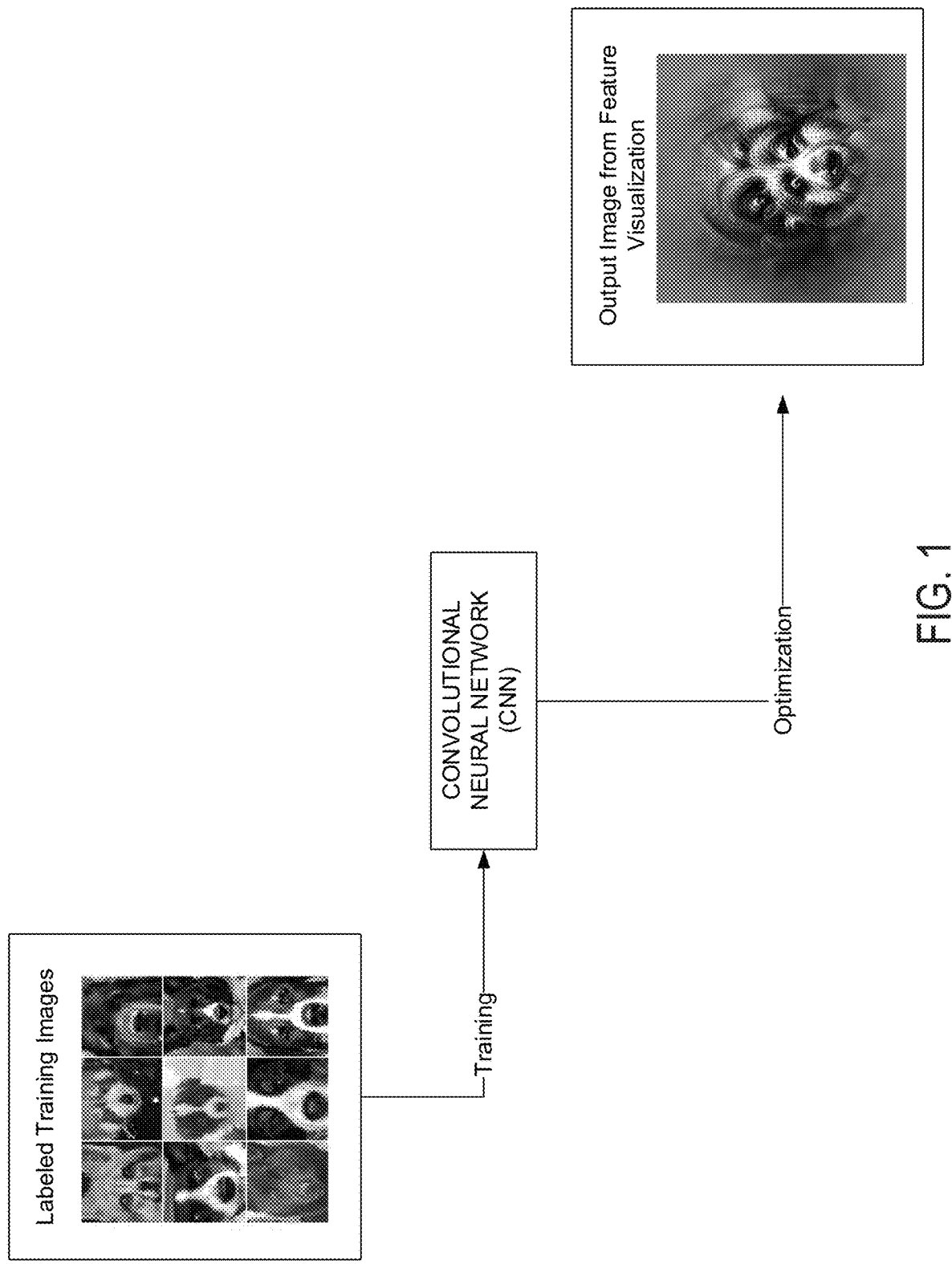
FIG. 1 conceptually illustrates an example of feature visualization in a trained convolutional neural network.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Perception systems of autonomous vehicles are designed to detect various objects in the surrounding environment in order to execute effective navigation and planning operations. These perception systems use models that have been trained using labeled data. In many instances, the labeled data is image-based, and includes camera, LiDAR, and/or radar data.

Once a model has been trained, it can be validated and used against a larger image-based data set that is often not labeled. Although the trained model may have been trained on certain objects, the performance may be less than desired. For example, it may fail to correctly detect and identify the object when it is in certain surrounding scenes. It is therefore desirable to understand what features associated with the object or in the surrounding scene may be contributing to errors in the detection and identification. Those features may be directly associated with the object, or they may only be correlated with the object. As an example, a model might have been trained to recognize wolves and huskies and to distinguish between them. Images labeled as huskies and images labeled as wolves would have been used for that training. Once trained, the model may perform well on unlabeled image data when the wolf is in a snowy environment, but the model may incorrectly identify a wolf as a huskie if there is no snow in the scene. In such an instance, the model may be using snow in the scene to distinguish between wolf and huskie. The snow is correlated with the wolf, but snow in the scene is not a feature of the wolf. Feature visualization may help to understand why the model is operating in this fashion, and that understanding can be used to improve the model. As an example, labeled images of wolves without snow in the scene might be used to further train the model, or the images of wolves with snow in the scene might be removed from the training data set and the model retrained without those snow images.

The idea of feature visualization is known, and the Nov. 7, 2017 paper by Chris Olah, Alexander Mordvintsev and Ludwig Schubert titled "Feature Visualization" How neural networks build up their understanding of images, which is available at https://distill.pub/2017/feature-visualization/, provides background on the idea and also provides examples. Some of that background and some examples in this specification are taken from or derived from that paper, which will be referred to hereinafter as "Olah".

As described in Olah, it is possible to determine what kind of input will cause a particular behavior of a model. This can be done by the use of derivatives to iterate an input towards that goal. Conceptually, a single neuron or a channel of a trained model is/are iteratively stimulated, starting from an image of random noise, to generate an artificial image that represents the features triggering that single neuron or channel. This process may be referred to as optimization. It gives an example input image that causes the desired behavior. In a similar fashion, it is possible to discover the best and worst operating conditions of a model by differentiating the input with respect to model errors, as opposed to differentiating the loss with respect to model weights as might be typically done. As an example, this may allow a determination that a trained AV model has a high width error when vehicles are at 90 degrees to the AV.

As illustrated in FIG. 1, if a model that has been trained on labeled images of animals, then feature visualization of neurons or channels for that model using optimization may generate an example image that appears to show animal faces and snouts of those animals. The concept of the instant invention is similar. By training a model to predict errors in the model, and then stimulating the CNN with those model errors, it is possible to generate images that provide a visualization of the model errors.

Figure 2A:
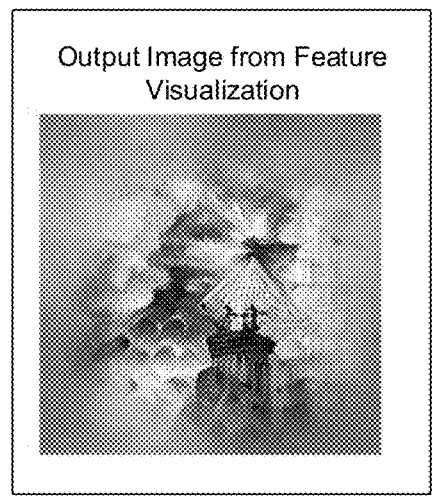
FIGS. 2A and 2B conceptually illustrate examples of feature visualization in a trained convolutional neural network.

In another example illustrated in FIG. 2A, a model may have been trained to recognize crosses on the tops of buildings. Feature visualization of the associated neuron or channel, generates an example image that appears to include a cross, but it also includes blue sky. In this example, the feature visualization helps to show that the model may be performing poorly in certain instances because it is using blue sky as a feature for recognition and identification, although the blue sky is only correlated with the cross on the top of the church.

With regard to the output image in FIG. 2A, to improve the model performance, the labeled training image set may be adjusted to include more images of crosses on the tops of buildings without blue sky, or images with blue sky may be removed from the labeled training image set. With that change the model can be retrained, or further trained. In the instant invention, a similar concept is used with feature visualization to generate images associated with model errors, and then adjust the training image set to reduce the errors.

Figure 2B:
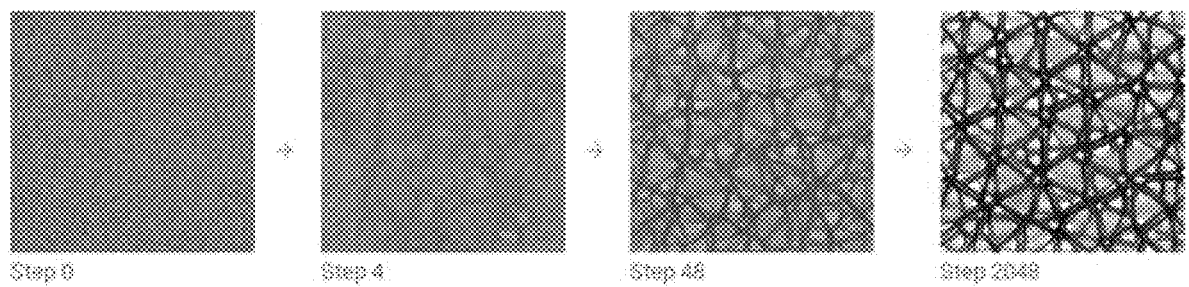

As described by Olah, one approach for feature visualization starts from an image with random noise. Iterative optimization from that random image, to maximally stimulate the desired neuron or channel proceeds through multiple steps. That iterative process may include jittering, rotation or scaling of the generated image between steps to reduce noise. FIG. 2B illustrates an example of one such feature visualization.

Figure 3:
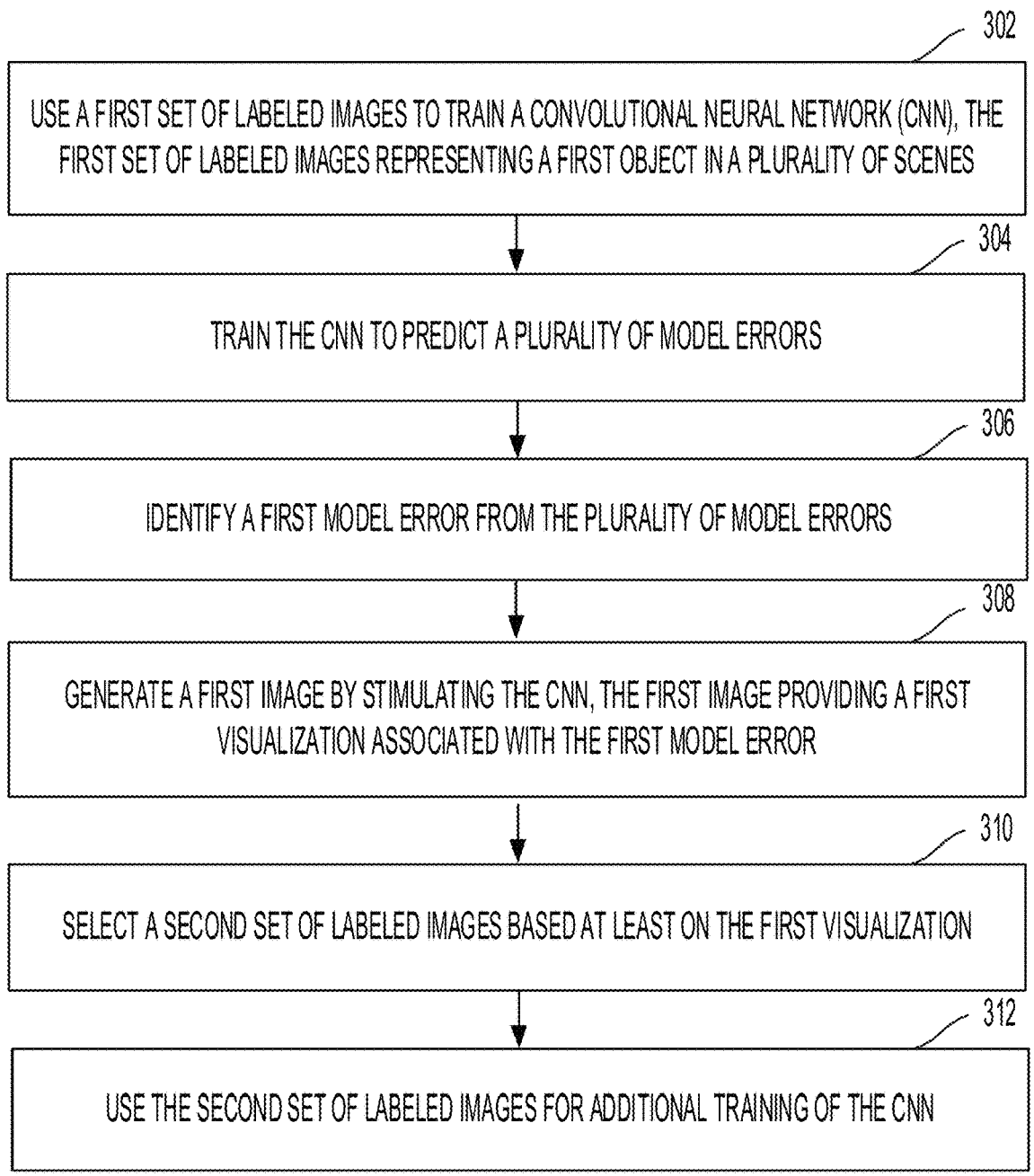
FIG. 3 illustrates a flow diagram of an example process for using feature visualization in a convolutional neural network, according to some aspects of the disclosed technology.

FIG. 3 illustrates a flow diagram of an example process 300, according to some aspects of the disclosed technology. At step 302, the process 300 includes using a first set of labeled images to train a convolutional neural network (CNN). The first set of labeled images represent a first object in a plurality of scenes.

At step 304, the process 300 includes training the CNN to predict a plurality of model errors. The predicted model errors could be from the same CNN, or a different CNN.

At step 306, the process 300 includes identifying a first model error from the plurality of model errors. The identification or selection of the first model error could be to maximize the total model error, or it could be to identify a model error that contributes to the total model error, but is not the largest source of error.

At step 308, the process 300 includes generating a first image by stimulating the CNN. The first image provides a visualization associated with the first model error.

At step 310, the process 300 includes selecting a second set of labeled images based at least on the visualization of the first model error. This could include selecting images that deemphasize a feature that is included in the first image, or it could include selecting images that emphasize a feature that is included in the first image.

At step 312, the process 300 includes using the second set of labeled images for additional training of the CNN. The additional training could be the addition or the subtraction of training images and then retraining the existing CNN with the revised training set, or it could be further training using the revised training images.

In the example of FIG. 1, a dog neuron of the CNN is stimulated. In the instant invention, the model is trained to predict its own error, and that error is used as an input to feature visualization. The invention is conceptually stimulating a neuron associated with a source of model error. This will generate scenes that represent a source of error, and those scenes can be used to identify areas where further training is needed.

As a further example, the largest model error might be associated with protected left turns where a large number of people are near by. Feature visualization, using that largest model error should generate images representing that type of scene (protected left turns where a large number of people are near by). If it is already known that this type of scene is a problem and it is being worked on, then another model error can be used as an input, and feature visualization may show a scene that was not already known to be causing problems. This allows the identification of difficult scenes that are error sources, whether they were previously known, or not. This can be considered as a regression on model error.

Uncertainty sampling is a known concept that can be used to prioritize data for training. Under this paradigm, an uncertainty metric is defined, and that metric used to capture data for which a model is least confident in its decision. Those examples are then prioritized for annotation and training. The instant invention similarly combines the concept of uncertainty sampling with feature visualization to identify scenes that can be prioritized for labeling and training.

Figure 4:
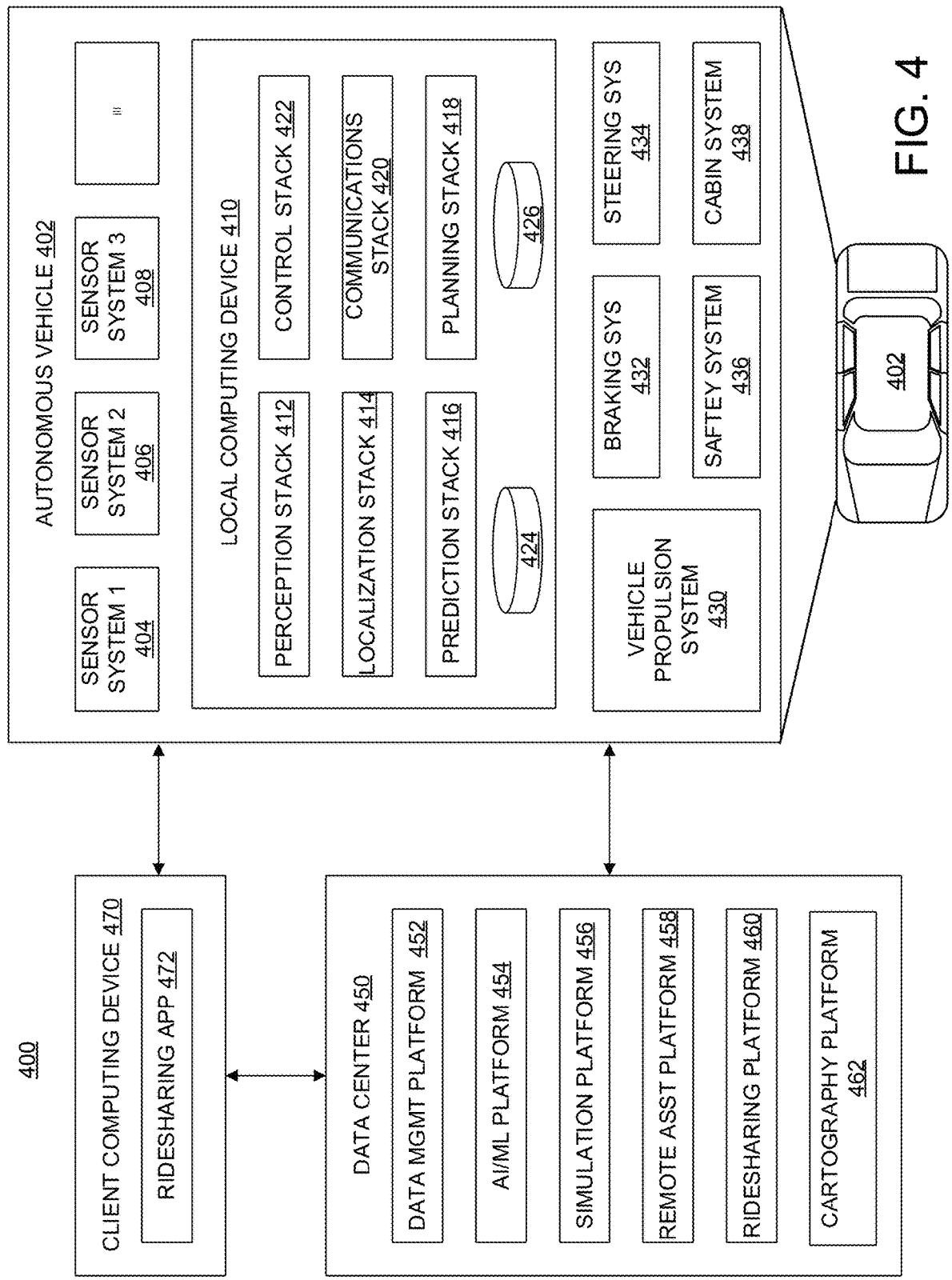
FIG. 4 illustrates an example system for managing one or more Autonomous Vehicles (AVs), according to some aspects of the disclosed technology.

FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 402 can navigate roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LiDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LiDAR system, and the sensor system 408 can be a RADAR system. Other embodiments may include any other number and type of sensors.

The AV 402 can also include several mechanical systems that can be used to maneuver or operate the AV 402. For instance, the mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some embodiments, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a prediction stack 416, a planning stack 418, a communications stack 420, a control stack 422, an AV operational database 424, and an HD geospatial database 426, among other stacks and systems.

The perception stack 412 can enable the AV 402 to "see" (e.g., via cameras, LiDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.).

The perception stack 412 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 414 can determine the AV's position and orientation (pose) using different methods from multiple systems (e.g., GPS, IMUs, cameras, LiDAR, RADAR, ultrasonic sensors, the HD geospatial database 426, etc.). For example, in some embodiments, the AV 402 can compare sensor data captured in real-time by the sensor systems 404-408 to data in the HD geospatial database 426 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LiDAR). If the mapping and localization information from one system is unavailable, the AV 402 can use mapping and localization information from a redundant system and/or from remote data sources.

The prediction stack 416 can receive information from the localization stack 414 and objects identified by the perception stack 412 and predict a future path for the objects. In some embodiments, the prediction stack 416 can output several likely paths that an object is predicted to take along with a probability associated with each path. For each predicted path, the prediction stack 416 can also output a range of points along the path corresponding to a predicted location of the object along the path at future time intervals along with an expected error value for each of the points that indicates a probabilistic deviation from that point.

The planning stack 418 can determine how to maneuver or operate the AV 402 safely and efficiently in its environment. For example, the planning stack 418 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. The planning stack 418 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct the AV 402 to go around the block instead of blocking a current lane while waiting for an opening to change lanes.

The control stack 422 can manage the operation of the vehicle propulsion system 430, the braking system 432, the steering system 434, the safety system 436, and the cabin system 438. The control stack 422 can receive sensor signals from the sensor systems 404-408 as well as communicate with other stacks or components of the local computing device 410 or a remote system (e.g., the data center 450) to effectuate operation of the AV 402. For example, the control stack 422 can implement the final path or actions from the multiple paths or actions provided by the planning stack 418. This can involve turning the routes and decisions from the planning stack 418 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 426 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408, stacks 412-422, and other components of the AV 402 and/or data received by the AV 402 from remote systems (e.g., the data center 450, the client computing device 470, etc.). In some embodiments, the raw AV data can include HD LiDAR point cloud data, image data, RADAR data, GPS data, and other sensor data that the data center 450 can use for creating or updating AV geospatial data or for creating simulations of situations encountered by AV 402 for future testing or training of various machine learning algorithms that are incorporated in the local computing device 410.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, and a ridesharing platform 460, among other systems.

The data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the cartography platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the cartography platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the cartography platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to pick up or drop off from the ridesharing application 472 and dispatch the AV 402 for the trip.

Figure 5:
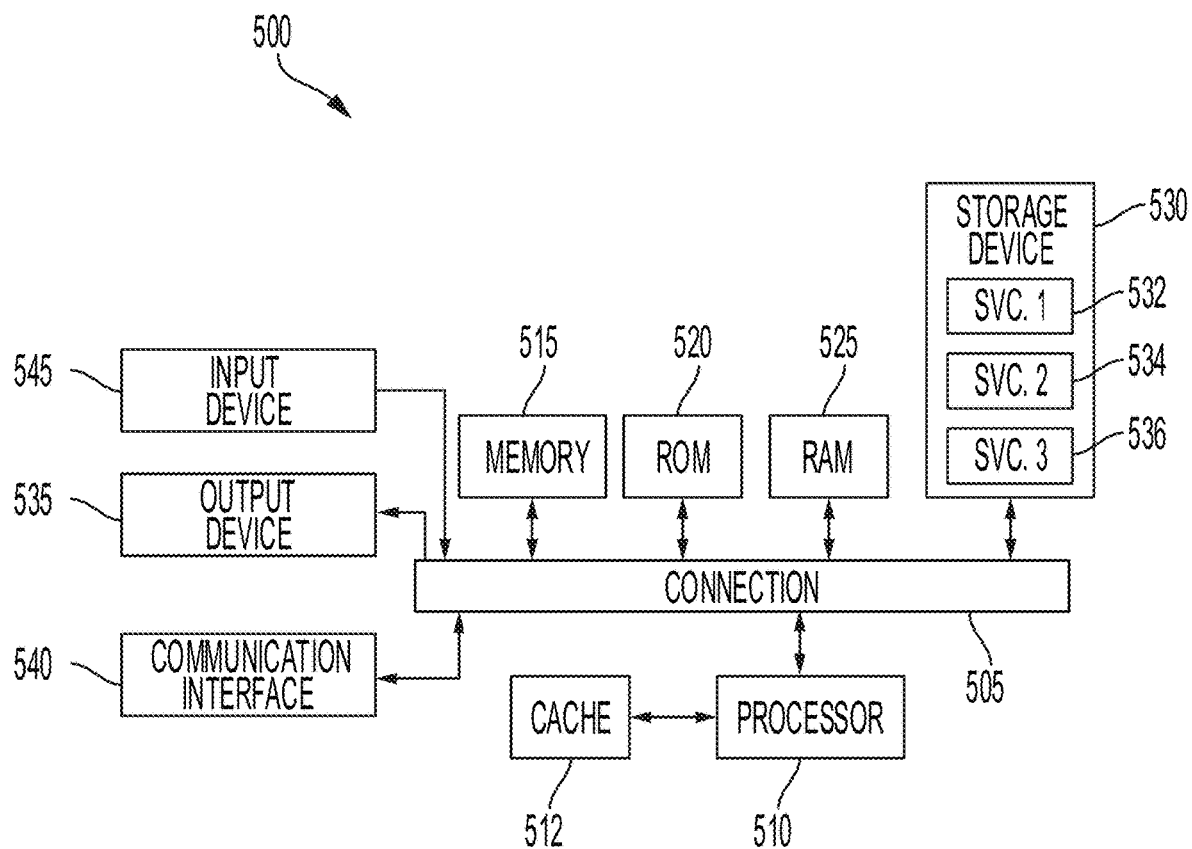
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up local computing device 410, client computing device 470, a passenger device executing the rideshare app 472, data center 450, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Illustrative examples of the disclosure include:

Aspect 1. A computer-implemented method for training a convolutional neural network (CNN), the method comprising: using a first set of labeled images to train the CNN, the first set of labeled images representing a first object in a plurality of scenes; training the CNN to predict a plurality of model errors; identifying a first model error from the plurality of model errors; generating a first image by stimulating the CNN, the first image providing a first visualization associated with the first model error; selecting a second set of labeled images based at least on the first visualization; and using the second set of labeled images for additional training of the CNN.

Aspect 2. The computer-implemented method of Aspect 1, further comprising: selecting the second set of labeled images to emphasize the first visualization associated with the first model error.

Aspect 3. The computer-implemented method of any of Aspects 1-2, further comprising: selecting the second set of labeled images to de-emphasize the first visualization associated with the first model error.

Aspect 4. The computer-implemented method of any of Aspects 1-3, further comprising: training a second CNN to predict the plurality of model errors; and identifying the first model error using the second CNN.

Aspect 5. The computer-implemented method of any of Aspects 1-4, further comprising: identifying a second model error from the plurality of model errors, the second model error different from the first model error; generating a second image by stimulating the CNN, the second image providing a second visualization associated with the second model error; selecting a third set of labeled images based at least on the second visualization of the second model error; and using the third set of labeled images for further training of the CNN.

Aspect 6. The computer-implemented method of any of Aspects 1-5, further comprising: selecting the second set of images by removing one or more images from the first set of labeled images based at least on the first visualization associated with the first model error; and using the second set of images to retrain the CNN.

Aspect 7. The computer-implemented method of any of Aspects 1-6, further comprising: selecting the second set of images by adding one or more images to the first set of labeled images based at least on the first visualization associated with the first model error; and using the second set of images to retrain the CNN.

Aspect 8. The computer-implemented method of any of Aspects 1-7, further comprising determining that the first model error in the plurality of model errors is associated with a maximum model error.

Aspect 9. An apparatus for training a convolutional neural network (CNN), the apparatus comprising: at least one memory; and at least one processor coupled to the at least one memory, the at least one processor configured to: use a first set of labeled images to train the CNN, the first set of labeled images representing a first object in a plurality of scenes; train the CNN to predict a plurality of model errors; identify a first model error from the plurality of model errors; generate a first image by stimulating the CNN, the first image providing a first visualization associated with the first model error; select a second set of labeled images based at least on the first visualization; and use the second set of labeled images for additional training of the CNN.

Aspect 10. The apparatus of Aspect 9, wherein the processor is further configured to select the second set of labeled images to emphasize the first visualization associated with the first model error.

Aspect 11. The apparatus of any of Aspects 9-10, wherein the processor is further configured to select the second set of labeled images to de-emphasize the first visualization associated with the first model error.

Aspect 12. The apparatus of any of Aspects 9-11, wherein the processor is further configured to train a second CNN to predict the plurality of model errors; and identify the first model error using the second CNN.

Aspect 13. The apparatus of any of Aspects 9-12, wherein the processor is further configured to: identify a second model error from the plurality of model errors, the second model error different from the first model error; generate a second image by stimulating the CNN, the second image providing a second visualization associated with the second model error; select a third set of labeled images based at least on the second visualization of the second model error; and use the third set of labeled images for further training of the CNN.

Aspect 14. The apparatus of any of Aspects 9-13, wherein the processor is further configured to: select the second set of images by removing one or more images from the first set of labeled images based at least on the first visualization associated with the first model error; and use the second set of images to retrain the CNN.

Aspect 15. The apparatus of any of Aspects 9-14, wherein the processor is further configured to: select the second set of images by adding one or more images to the first set of labeled images based at least on the first visualization of the first model error; and use the second set of images to retrain the CNN.

Aspect 16. The apparatus of any of Aspects 9-15, wherein the processor is further configured to determine that the first model error in the plurality of model errors is associated with a maximum model error.

Aspect 17. A non-transitory computer-readable storage medium comprising at least one instruction for causing a computer or processor to: use a first set of labeled images to train a convolutional neural network (CNN), the first set of labeled images representing a first object in a plurality of scenes; train the CNN to predict a plurality of model errors; identify a first model error from the plurality of model errors; generate a first image by stimulating the CNN, the first image providing a first visualization associated with the first model error; select a second set of labeled images based at least on the first visualization; and use the second set of labeled images for additional training of the CNN.

Aspect 18. The non-transitory computer-readable storage medium of Aspect 17, wherein the at least one instruction is further configured to cause the processor to select the second set of labeled images to emphasize the first visualization associated with the first model error.

Aspect 19. The non-transitory computer-readable storage medium of any of Aspects 17-18, wherein the at least one instruction is further configured to cause the processor to select the second set of labeled images to de-emphasize the first visualization associated with the first model error.

Aspect 20. The non-transitory computer-readable storage medium of any of Aspects 17 to 19, wherein the at least one instruction is further configured to cause the processor to: identify a second model error from the plurality of model errors, the second model error different from the first model error; generate a second image by stimulating the CNN, the second image providing a second visualization associated with the second model error; select a third set of labeled images based at least on the second visualization of the second model error; and use the third set of labeled images for further training of the CNN.

Aspect 21. A system comprising means for performing a method according to any of Aspects 1 to 8.

What is claimed is:

1. A computer-implemented method for training a convolutional neural network (CNN), the method comprising:
   using a first set of labeled images to train the CNN, the first set of labeled images representing a first object in a plurality of scenes surrounding a vehicle in an environment;
   training the CNN to predict a plurality of model errors;
   identifying a first model error from the plurality of model errors, wherein the first model error is associated with a type of scene from among the plurality of scenes;
   generating a first image by stimulating the CNN, the first image providing a first visualization associated with the first model error;
   selecting a second set of labeled images based at least on the first visualization; and
   using the second set of labeled images for additional training of the CNN.

2. The computer-implemented method of claim 1, further comprising selecting the second set of labeled images to emphasize the first visualization associated with the first model error.

3. The computer-implemented method of claim 1, further comprising selecting the second set of labeled images to de-emphasize the first visualization associated with the first model error.

4. The computer-implemented method of claim 1, further comprising:
training a second CNN to predict the plurality of model errors; and
identifying the first model error using the second CNN.

5. The computer-implemented method of claim 1, further comprising:
identifying a second model error from the plurality of model errors, the second model error different from the first model error;
generating a second image by stimulating the CNN, the second image providing a second visualization associated with the second model error;
selecting a third set of labeled images based at least on the second visualization of the second model error; and
using the third set of labeled images for further training of the CNN.

6. The computer-implemented method of claim 1, further comprising:
selecting the second set of images by removing one or more images from the first set of labeled images based at least on the first visualization associated with the first model error; and
using the second set of images to retrain the CNN.

7. The computer-implemented method of claim 1, further comprising:
selecting the second set of images by adding one or more images to the first set of labeled images based at least on the first visualization associated with the first model error; and
using the second set of images to retrain the CNN.

8. The computer-implemented method of claim 1, further comprising determining that the first model error in the plurality of model errors is associated with a maximum model error.

9. An apparatus for training a convolutional neural network (CNN), the apparatus comprising:
at least one memory; and
at least one processor coupled to the at least one memory, the at least one processor configured to:
use a first set of labeled images to train the CNN, the first set of labeled images representing a first object in a plurality of scenes surrounding a vehicle in an environment;
train the CNN to predict a plurality of model errors;
identify a first model error from the plurality of model errors, wherein the first model error is associated with a type of scene from among the plurality of scenes;
generate a first image by stimulating the CNN, the first image providing a first visualization associated with the first model error;
select a second set of labeled images based at least on the first visualization; and
use the second set of labeled images for additional training of the CNN.

10. The apparatus of claim 9, wherein the processor is further configured to select the second set of labeled images to emphasize the first visualization associated with the first model error.

11. The apparatus of claim 9, wherein the processor is further configured to select the second set of labeled images to de-emphasize the first visualization associated with the first model error.

12. The apparatus of claim 9, wherein the processor is further configured to:
train a second CNN to predict the plurality of model errors; and
identify the first model error using the second CNN.

13. The apparatus of claim 9, wherein the processor is further configured to:
identify a second model error from the plurality of model errors, the second model error different from the first model error;
generate a second image by stimulating the CNN, the second image providing a second visualization associated with the second model error;
select a third set of labeled images based at least on the second visualization of the second model error; and
use the third set of labeled images for further training of the CNN.

14. The apparatus of claim 9, wherein the processor is further configured to:
select the second set of images by removing one or more images from the first set of labeled images based at least on the first visualization associated with the first model error; and
use the second set of images to retrain the CNN.

15. The apparatus of claim 9, wherein the processor is further configured to:
select the second set of images by adding one or more images to the first set of labeled images based at least on the first visualization of the first model error; and
use the second set of images to retrain the CNN.

16. The apparatus of claim 9, wherein the processor is further configured to determine that the first model error in the plurality of model errors is associated with a maximum model error.

17. A non-transitory computer-readable storage medium comprising at least one instruction for causing a computer or processor to:
use a first set of labeled images to train a convolutional neural network (CNN), the first set of labeled images representing a first object in a plurality of scenes surrounding a vehicle in an environment;
train the CNN to predict a plurality of model errors;
identify a first model error from the plurality of model errors, wherein the first model error is associated with a type of scene from among the plurality of scenes;
generate a first image by stimulating the CNN, the first image providing a first visualization associated with the first model error;
select a second set of labeled images based at least on the first visualization; and
use the second set of labeled images for additional training of the CNN.

18. The non-transitory computer-readable storage medium of claim 17, wherein the at least one instruction is further configured to cause the processor to select the second set of labeled images to emphasize the first visualization associated with the first model error.

19. The non-transitory computer-readable storage medium of claim 17, wherein the at least one instruction is further configured to cause the processor to select the second set of labeled images to de-emphasize the first visualization associated with the first model error.

20. The non-transitory computer-readable storage medium of claim 17, wherein the at least one instruction is further configured to cause the processor to:
- identify a second model error from the plurality of model errors, the second model error different from the first model error;
- generate a second image by stimulating the CNN, the second image providing a second visualization associated with the second model error;
- select a third set of labeled images based at least on the second visualization of the second model error; and
- use the third set of labeled images for further training of the CNN.

* * * * *